Dec. 29, 1936.  J. E. CREGIER  2,066,174
POWER ATTACHMENT FOR LAWN MOWERS
Filed Dec. 2, 1935  2 Sheets-Sheet 1
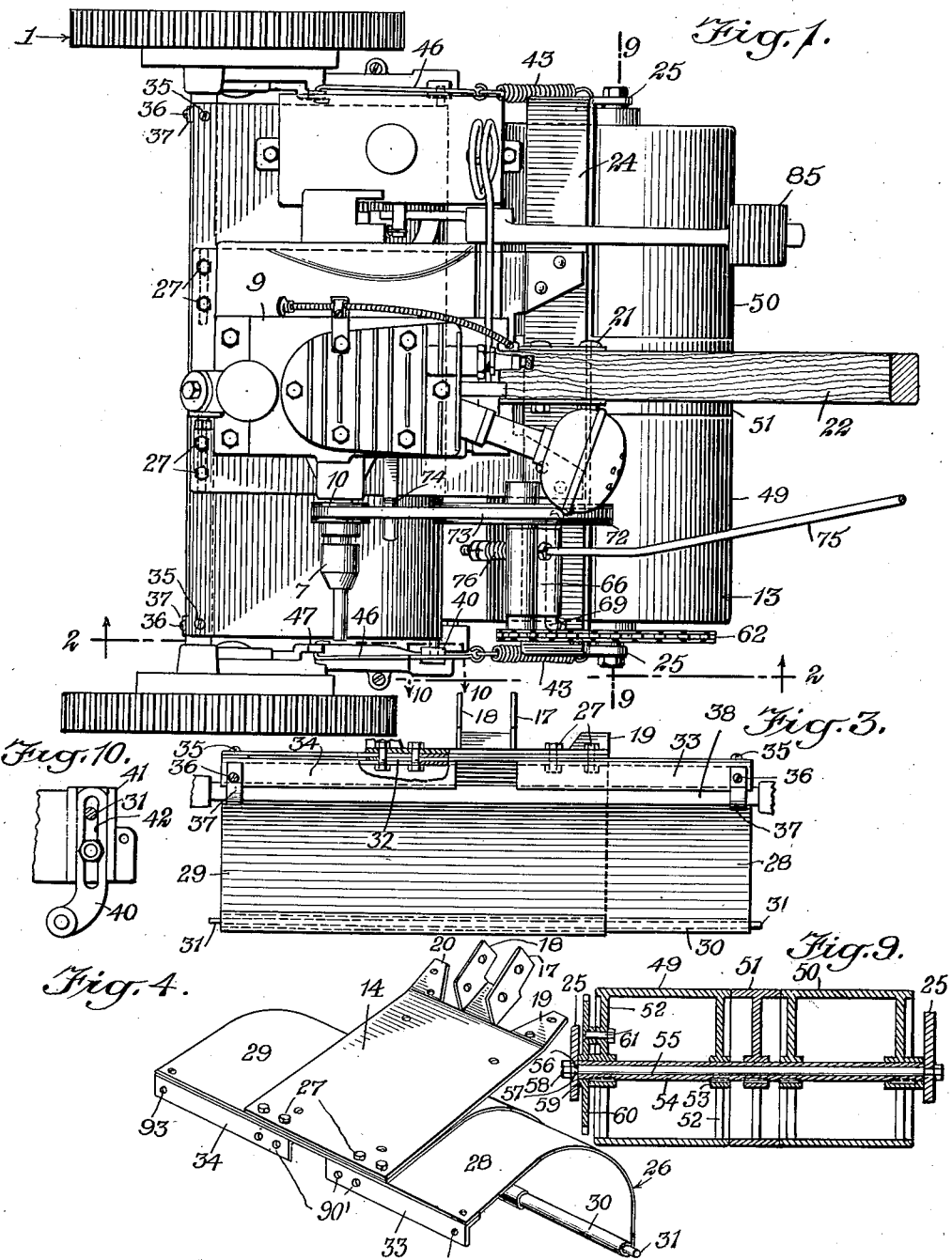
WITNESSES
INVENTOR
John E. Cregier
BY
ATTORNEYS Dec. 29, 1936.　　　J. E. CREGIER　　　2,066,174
POWER ATTACHMENT FOR LAWN MOWERS
Filed Dec. 2, 1935　　　2 Sheets-Sheet 2
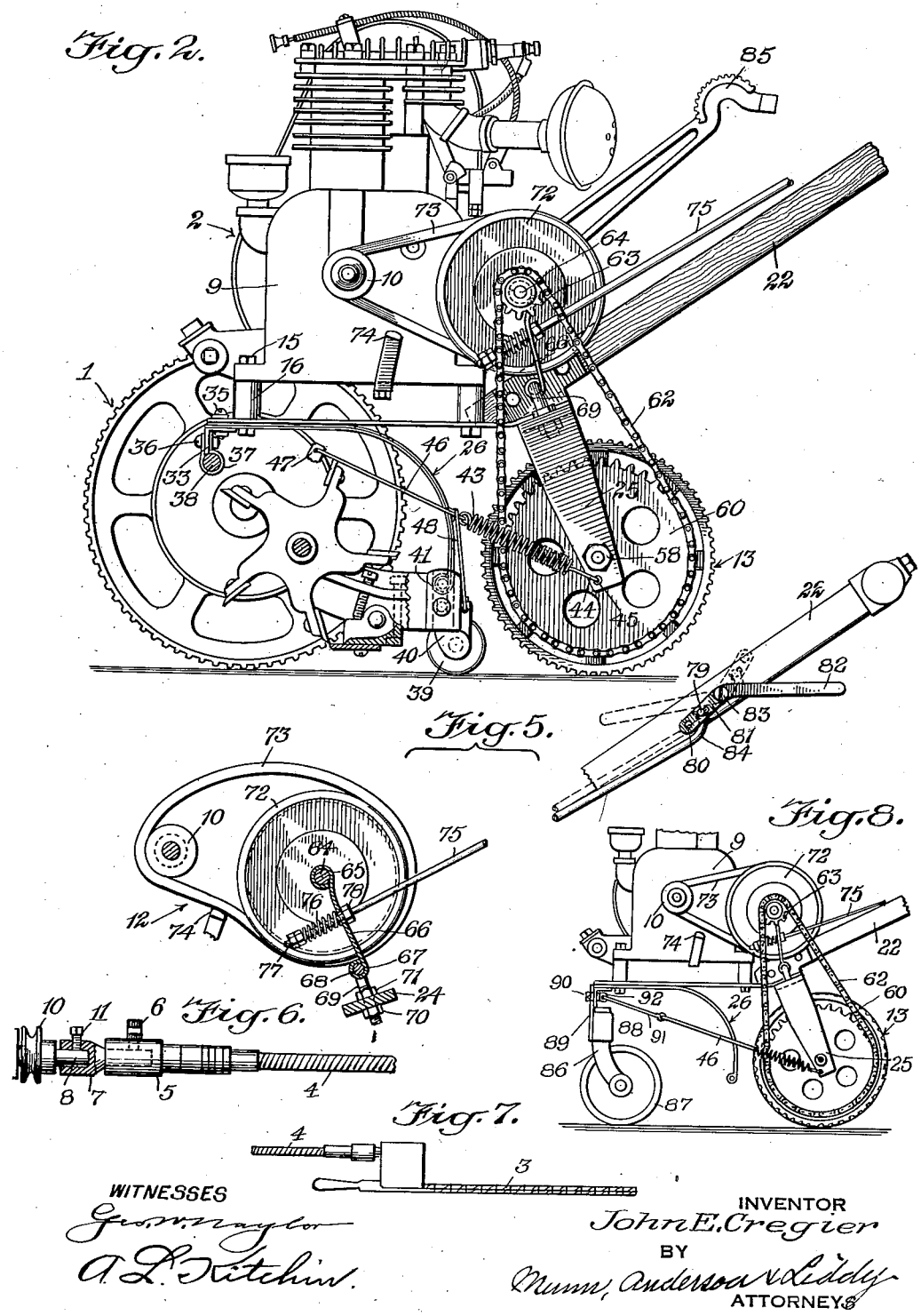
WITNESSES
INVENTOR
John E. Cregier
BY
Munn, Anderson & Liddy
ATTORNEYS Patented Dec. 29, 1936

2,066,174

UNITED STATES PATENT OFFICE 2,066,174

POWER ATTACHMENT FOR LAWN MOWERS

John E. Cregier, Chappaqua, N. Y., assignor to Junior Manufacturing Corporation, Mount Kisco, N. Y., a corporation of New York Application December 2, 1935, Serial No. 52,569

6 Claims. (Cl. 56—26)

This invention relates to power attachments for lawn mowers, and has for an object to provide an improved construction which may be applied to a lawn mower without changing any part of the lawn mower, and when applied acts to propel the lawn mower and cause the same to function in the usual manner.

Another object of the invention is to provide a power attachment for lawn mowers which may be applied to various sized mowers, and which not only act as power means for driving the mowers but will act as a roller for rolling the lawn.

A still further object of the invention is to provide a combined lawn mower and power element with the parts so arranged that the lawn mower's handle may be used for steering the combined structure and the power element may be used in the double capacity of means for propelling the lawn mower and means for driving a hedge trimmer.

An additional object is to provide a power attachment for lawn mowers wherein a special clutch formation is provided whereby the power may be readily thrown into clutch and thrown out of clutch so that at one time it may act to drive the lawn mower and at another time act to drive other elements.

An additional and more specific object of the invention is to provide a power attachment which may be applied to lawn mowers or which may be used separately for rolling a lawn.

In the accompanying drawings:

Fig. 1 is a plan view of a combined power attachment and lawn mower disclosing an embodiment of the invention;

Fig. 2 is a sectional view through Fig. 1 approximately on the line 2—2;

Fig. 3 is a front elevation of a supporting platform and apron disclosing certain features of the invention;

Fig. 4 is a perspective view of the platform and apron illustrated in Fig. 3;

Fig. 5 is a fragmentary view in elevation showing part of the steering handle and the clutch structure associated therewith;

Fig. 6 is a view principally in elevation with certain parts broken away showing how a flexible cable may be connected to the driving shaft of the power element;

Fig. 7 is a fragmentary side view of a conventional hedge trimmer with part of a flexible hose connected therewith;

Fig. 8 is a side view on a reduced scale of the power attachment shown in Fig. 2 with a caster added thereto, the entire structure being adapted to be used as a power lawn roller;

Fig. 9 is a fragmentary sectional view through Fig. 1 approximately on the line 9—9 showing the interior construction of the roller;

Fig. 10 is a fragmentary sectional view on the line 10—10 of Fig. 1, the same being on a greatly enlarged scale.

Referring to the accompanying drawings by numerals, 1 indicates the lawn mower which is of any usual or preferred kind now commonly on the market. Associated with the lawn mower is a power attachment 2 which acts to drive the lawn mower 1 or which may be adjusted to drive the hedge trimmer 3 through the use of the flexible hose or cable 4. From Fig. 6 it will be observed that the cable 4 has a socket 5 rigidly secured thereto so that the set screw 6 may clamp the end of a fitting 7, which fitting has a socket adapted to slide over the end of shaft 8 which is the power shaft of the motor 9. A power pulley 10 is rigidly secured to this shaft and functions as hereinafter fully described. When the lawn mower is being used the set screw 11 acts to clamp fitting 7 to shaft 8 so that as shaft 8 rotates the hedge trimmer will function in the usual manner. It will be understood that the hedge trimmer is a trimmer of the kind now in common use and is merely driven by the rotation of the flexible cable or shaft 4. When the hedge trimmer is being used the clutch mechanism 12 is thrown out so that there will be no power transmitted to the propelling and rolling drum 13.

It will be understood that the engine 9 is a well known engine now on the market and is mounted on the platform 14 by suitable bolts 15 with sleeves 16 arranged to surround the bolts so as to space the engine a short distance above the platform. This platform at the rear is provided with turned-up ears 17 and 18 and with auxiliary apertured ears 19 and 20. Suitable bolts 21 extend through the apertures of ears 17 and 18 and through the handle 22 for securing the handle to platform 14 whereby the handle may be used for steering the combined structure. Bolts or rivets 23 extend through the apertures of ears 19 and 20 and through a bar 24, which bar extends beyond the ends of roller 13 where it is bent down to form the respective legs 25. Referring again to the platform 14 it will be observed that there is provided an apron 26 connected thereto by bolts 27. Apron 26 is made in two sections namely sections 28 and 29, which telescope over each other. Each of these sections is provided with a curled or tubular edge 30 through which the bar or rod 31 extends. From Figs. 3 and 4 it will be observed that the curled or tubular edge 30 of one section slides within the tubular edge of the other section. This permits the apron to be adjusted so that it will accommodate a wider or narrower lawn mower. This apron acts to prevent the grass as it is being cut to fly up into the other mechanism.

As shown in Fig. 3 each of the sections is provided with a slot 32 so that when it is desired to adjust the sections in respect to each other it is only necessary to loosen the bolts 27 and then move the sections to the desired new position, after which the bolts are tightened. These bolts in addition to extending through platform 14 extend through the sections and through one leg of the respective angle irons 33 and 34. The respective bolts 35 with the bolts 27 act to clamp the angle irons 33 and 34 in place, while the respective bolts 36 clamp the respective loops 37 in place. These loops are slid over or looped over the usual rod 38 on the lawn mower 1 before the bolts 36 are mounted in place. Rod 38 is part of the lawn mower and is a well known structure in many lawn mowers. It will be seen that by the use of the loops 37 the power element is connected to rod or shaft 38 at two points.

In lawn mower 1 there is provided the usual roller 39 which is carried by the respective brackets 40, which brackets are adjustably mounted in the fitting 41. Each of these brackets as shown in Fig. 10 is provided with a slot 42 into which the respective ends of rod 31 extend. It will be understood that the structure shown in Fig. 10 is an old and well known structure commonly used on lawn mowers of the kind indicated by the numeral 1. However, the new feature is the use of a slot 42 to accommodate the end of the rod 31. This makes a second connection of the power element with the lawn mower. It will be understood that when the power element is to be applied to the lawn mower the handle is removed and the yoke which is connected therewith is laid aside and the handle bolted to the ears 17 and 18 as heretofore described. A third connection is provided on each side for connecting the power element to the lawn mower, said third connection being a spring 43 as shown in Fig. 2. This spring at one end has a hooked extension 44, said hooked extension extending through the aperture 45 of leg 25. The opposite end of the spring is connected by a link 46 to the usual apertured bracket 47 on a lawn mower. A link 48 is hooked into the fitting 41 and over the link 46 so as to connect the spring 43 with the bracket or fitting 41. This arrangement is provided on each side of the lawn mower and connects the lower ends of the respective legs 25 with the respective brackets 47. The use of the respective springs 43 is to permit a certain amount of independent up and down movement of the traction wheels of the lawn mower 1 and the drum or roller 13.

The drum or roller 13 may be made in one piece if desired, but is preferably made in two or three parts as shown particularly in Fig. 9. This is desirable in order that the parts may be made standard. As shown in Fig. 1 the respective end sections 49 and 50 are of the same size while the central section 51 is smaller. If it should be desired to place the power attachment on a larger lawn mower it would be necessary to move the central section 51 and place another and larger section in position. In a case of this kind it would be necessary to loosen the bolts 27 to lengthen the apron 26. As shown in Fig. 9 each of the sections of the drum or roller 13 is provided with spokes 52 having hubs 53 which may be keyed or otherwise rigidly secured to a sleeve 54 which extends from one leg 25 to the other leg. A shaft or rod 55 extends through sleeve 54 and presses against the inner surfaces of the respective legs 25 by reason of the respective shoulders 56. The reduced extensions 57 are threaded at their outer ends so that the respective nuts 58 may be tightened and the legs 25 clamped firmly to the shaft or rod 55. The sleeve 54 is rotatably mounted on shaft 55 and has the hub 59 of the sprocket wheel 60 mounted thereon. Hub 59 may be keyed to the sleeve 54 if desired, but preferably one or more bolts 61 extend through one or more spokes 52 and through the body of the sprocket wheel, whereby the sprocket wheel is rigidly secured to the drum and all parts of the drum are rigidly secured together so as to rotate as a unit. Preferably the drum or roller 13 is slightly corrugated so as to secure a good traction when in use.

A sprocket chain 62 is fitted over the sprocket wheel 60 and also over a small sprocket wheel 63 which is rigidly secured to shaft 64. Shaft 64 is rotatably mounted in the curled end or knuckle 65 of plate 66, which plate has a second ear or knuckle 67 through which the top bar 68 of a U-bolt 69 extends. This U-bolt extends through the bar 24 and is provided with nuts 70 and 71 whereby upon a proper actuation of these nuts the U-bolt may be raised or lowered to take care of the wear in chain 62 or of any of the other parts. Adjacent the end of shaft 64 opposite sprocket wheel 63 there is provided a comparatively large pulley wheel 72 which is rigidly secured to the shaft so as to rotate therewith. Pulley wheels 10 and 72 are known as V-pulleys so as to accommodate a V-belt 73. When the parts are in the position shown in Fig. 2 the belt is tight and if the engine 9 was running power would be transmitted from pulley 10 to belt 73 and through belt 73 to pulley 72, whereby shaft 64 would be rotated and sprocket wheel 26 driven. Upon driving sprocket wheel 63, sprocket wheel 60 will be rotated and consequently the drum 13 will be rotated for propelling the entire structure over the surface on which it is resting.

In order to present a clutch structure the plate 66 is pivotally mounted on the bar 68 as shown in Fig. 5 and when forced to the position shown in Fig. 5 the pulley 72 will be much nearer pulley 10 than in Fig. 2. This will loosen belt 73 which will then rest upon the belt support 74 which is bolted or otherwise rigidly secured to the housing of engine 9, or if desired to some other stationary part. This arrangement causes the belt to remain in place even though pulley 10 is rotated and not transmitting any power to the belt. A rod 75 extends loosely through the plate 66 as illustrated particularly in Fig. 5. A spring 76 with the nuts 77 form a cushion when rod 75 is pulled to the right as shown in Fig. 5. A nut 78 acts as an abutment so that when the rod 75 is pushed to the left from the position shown in Fig. 2 to that shown in Fig. 5, pulley 72 will swing towards pulley 10 for loosening belt 73. Rod 75 at its extreme right end as shown in Fig. 5 is provided with a turned-over end 79 loosely extending through one of the apertures 80 in the extension 81 of lever 82, which lever is pivotally mounted at 83 on handle 22.

When the parts are in the position shown in Fig. 5, the engine may be idling or may be driving the hedge trimmer 3, but is not transmitting any power to the drum 3. When it is desired to transmit power to the drum 3, lever 82 is moved over to the dotted position as shown in Fig. 5 and this movement will cause rod 75 to pull the plate 66 and associated parts to the position shown in Fig. 2. As indicated particularly at the right of Fig. 5, rod 75 is bent at 84 so that when the lever 82 is moved over to the dotted position as shown in Fig. 5 the bent part 84 will rest against the pin 83 so that the right angle extension 79 will be past dead center. This will lock the parts against movement until lever 82 has been shifted.

When it is desired to use the device as shown in Figs. 1 and 2, the lever 82 is moved to release the clutch 12, namely to move the parts to the position shown in Fig. 5. The starting lever or crank member 85 is then depressed one or more times for starting the engine. This lever and the entire engine is an old and well known structure and is started in the usual way by depressing the lever 85 one or more times. The engine 9 is a gasoline engine and is shown as a single cylinder engine, though an engine with more cylinders or different type engine might be used without departing from the spirit of the invention. After the engine has been started and is running, shaft 8 will be rotating and with it the pulley 10. To start the lawn mower forward it is only necessary to swing lever 82 over to the dotted position shown in Fig. 5, whereupon the belt 73 will be tightened and power will be transmitted to pulley 72 and associated parts. As the combined lawn mower and power attachment moves over the lawn the traction wheels of the lawn mower will actuate the cutters of the lawn mower in the usual manner. It will be understood that the power attachment merely pushes the lawn mower along and the lawn mower functions in the usual manner.

As the device moves over the lawn a person may readily steer the same by properly manipulating the handle 22. When it is desired to stop the forward movement of the device the clutch 12 is moved to the position shown in Fig. 5 and the device will stop though the engine will continue to function. To stop the engine disclosed it is only necessary to choke the same though other forms of engines may be used where the opening of the ignition circuit is necessary. After the device has been used to cut the grass and it should be desired to trim the hedge, the clutch is moved to inoperative or unclutched position and the engine is stopped. Fitting 7 as shown in Fig. 6 is then applied and the other attachments as shown in Figs. 6 and 7, after which the engine is started in the usual way. Power will then be transmitted to the hedge trimmer 3 but not to the drum 13. The flexible shaft 4 may be of any length, as for instance twenty or thirty feet long, and if this is not sufficient the device may be pushed manually to a new position without stopping the engine.

Under some circumstances the power attachment may be used as a lawn roller. When it is desired to use the device in this manner, the lawn mower 1 is removed and a caster 86 is applied as shown in Fig. 8. This caster consists of a wheel 87 of any desired size and width which is rotatably mounted in a fitting 88 to which a plate 89 is secured in any desired manner. Bolts 90 extend through plate 89 and through the apertures 90' as shown in Fig. 4. When the device is used in this manner a link 91 is provided for each of the links 46, said links 91 being connected by eye bolts 92 to the angle irons 33 and 34 by the eye bolts extending through the apertures 93. After the parts have been arranged as shown in Fig. 8 it is only necessary to start the engine and throw in the clutch and the device will move over the lawn and the drum 3 will act as a roller.

I claim:

1. The combination of a standard lawn mower and a power attachment disengageably secured thereto, said power attachment including a prime mover, a propelling drum, means for transmitting power from the prime mover to the drum and a clutch for disconnecting said means, said clutch including a swinging pulley, means for swinging said pulley to an inoperative position, a driving belt, and a belt retaining member for holding said belt in contact with said pulley while the pulley is in said inoperative position, said belt retaining member being positioned immediately below the lower run of the belt passing over said pulley so as to limit the downward swaying movement of said lower run when said pulley has been swung to an inoperative position.

2. A power attachment for a lawn mower comprising a platform, a plurality of means for connecting the platform to the lawn mower, a substantially U-shaped member connected to said platform at one end, a shaft connecting the ends of the U-shaped member, a drum rotatably mounted on said shaft, a sprocket wheel connected to said drum, a chain mounted on said sprocket wheel, a second sprocket wheel acting to drive said chain, a shaft rigidly secured to said second sprocket wheel, a pulley rigidly secured to said shaft, means for swingably mounting said shaft, a hand actuated rod for moving said swingable mounting to either of two extreme positions, a gasoline engine carried by said platform, a driving pulley connected with the rotating part of said engine, a belt mounted on both of said pulleys for transmitting power from the second mentioned pulley to the first mentioned pulley, and a stationary belt support positioned to hold part of the belt in contact with said pulleys when the first mentioned pulley has been swung toward the second mentioned pilley.

3. A power attachment for lawn mowers comprising a platform, means at the front of the platform for connecting the same to a lawn mower, a substantially arc-shaped apron connected at the front end with the front end of said platform and positioned so that its back edge will be back of the cutters of the lawn mower and near the lower part thereof for preventing grass from the lawn mower being projected into the remaining part of the device, means for slidably connecting the rear lower part of said apron to the rear part of said lawn mower, a motor mounted on said platform, a propelling drum arranged in back of said lawn mower, means carried by said drum for supporting the rear of said platform, and means for transmitting power from said motor to said drum for causing the drum to push the lawn mower when the motor is functioning.

4. In a power attachment for lawn mowers, a platform adapted to receive a motor, said platform having its front end connected to the front part of said lawn mower and an apron connected with the front part of said platform and extending rearwardly and downwardly to the rear lower part of the lawn mower for preventing the cut grass from the lawn mower being projected against said platform, said apron comprising a pair of substantially arc-shaped members of sheet material, each member having a tubular coil at one end, one tubular coil telescoping into the other, and means at the other front end of the apron for locking the same to the front end of the platform and also for locking the sections against independent movement.

5. A power attachment for a lawn mower comprising a gasoline motor, a driving drum, means for connecting said motor and drum to a lawn mower, means for transmitting power from the motor to the drum, said means including a pulley, a shaft rigidly secured to said pulley, a plate supporting said shaft, means for pivotally mounting said plate, adjusting means acting to raise and lower the plate, a rod connected with said plate, and a hand actuated lever for moving said rod so as to swing said pulley from one position to another for connecting and disconnecting said motor with said drum.

6. An attachment for lawn mowers comprising a platform having its front end connected with the lawn mower near the front thereof, an apron connected at its front end with the front end of said platform, said apron extending from the front end of said platform rearwardly and downwardly to the lower rear part of said lawn mower, means for connecting the rear of the apron to said lawn mower at the lower rear part of the mower, said platform at the rear having a pair of turned-up ears, a handle connected with said ears for steering the platform and parts connected therewith, a drum supporting the rear part of said platform, a gasoline motor arranged on top of said platform, and means for transmitting power from said motor to said drum for rotating the drum.

JOHN E. CREGIER.